United States Patent
Acharya et al.

(10) Patent No.: US 12,056,016 B2
(45) Date of Patent: Aug. 6, 2024

(54) SLICE SEARCHING FOR EFFICIENT GRANULAR LEVEL RECOVERY IN DATA PROTECTION

(71) Applicant: Dell Products L.P., Round Rock, TX (US)

(72) Inventors: Soumen Acharya, Bangalore (IN); Aaditya Rakesh Bansal, Bangalore (IN); Shelesh Chopra, Bangalore (IN); Upanshu Singhal, Bangalore (IN)

(73) Assignee: DELL PRODUCTS L.P., Houston, TX (US)

( * ) Notice: Subject to any disclaimer, the term of this patent is extended or adjusted under 35 U.S.C. 154(b) by 0 days.

(21) Appl. No.: 18/082,663

(22) Filed: Dec. 16, 2022

(65) Prior Publication Data

US 2024/0202074 A1 Jun. 20, 2024

(51) Int. Cl.
*G06F 11/14* (2006.01)

(52) U.S. Cl.
CPC ...... *G06F 11/1451* (2013.01); *G06F 11/1469* (2013.01); *G06F 2201/84* (2013.01)

(58) Field of Classification Search
CPC ............ G06F 11/1451; G06F 11/1469; G06F 2201/84; G06F 11/1458
USPC ................ 707/661, 674, 679, 685, 686
See application file for complete search history.

(56) References Cited

U.S. PATENT DOCUMENTS

| | | | | |
|---|---|---|---|---|
| 7,877,362 B2* | 1/2011 | Gokhale | ............... | G06Q 10/08 707/661 |
| 2003/0182253 A1* | 9/2003 | Chen | ..................... | G06F 16/10 707/E17.01 |
| 2012/0233417 A1* | 9/2012 | Kalach | ............... | G06F 11/1453 711/E12.103 |
| 2016/0292041 A1* | 10/2016 | Bender | .................. | G06F 11/00 |
| 2018/0081561 A1* | 3/2018 | Todd | ................... | G06F 11/1453 |

* cited by examiner

*Primary Examiner* — Phong H Nguyen
(74) *Attorney, Agent, or Firm* — Chamberlain, Hrdlicka, White, Williams & Aughtry; Aly Z. Dossa

(57) ABSTRACT

Embodiments of the invention relate to methods and systems for efficiently restoring a production host. Selected assets are restored from a plurality of slices stored on a plurality of containers in a backup storage system. In order to restore the selected assets, a hierarchical mapping of the slices is produced by analyzing a backup's metadata, from which the assets are to be restored. The hierarchical mapping is then searched for highest level slice containing the assets and then searching the lower-level slices associated with the highest-level slice to efficiently discover the slices containing the selected assets. This invention reduces and/or eliminates the need to crawl the entire slice list once the highest level is discovered; only its children need to be searched for the asset. Once the slices associated with an asset are found, they can be quickly restored from the corresponding containers which hold the assets.

17 Claims, 6 Drawing Sheets

```
In-memory Hierarchical Layout 400

Slice 1
Slice 2
        Slice 3
        Slice 4
                Slice5
        Slice 6
                Slice 7
                Slice 8
Slice 9
Slice 10
        Slice 11
                Slice 12
                Slice 13
                Slice 14
```

```
Backup container 1 410A

Slice 1
Slice 9
Slice 10
Slice 11
Slice 12
Slice 13
Slice 14
```

```
Backup container 2 410B

Slice 2
Slice 3
Slice 4
Slice 5
Slice 6
Slice 7
Slice 8
```

FIG. 4

SLICE SEARCHING FOR EFFICIENT GRANULAR LEVEL RECOVERY IN DATA PROTECTION

BACKGROUND

As people increasingly rely on computing systems and devices to perform a plethora of tasks; the systems have become increasingly complex, and the opportunities for failure and/or loss of important data has also increased. In order to avoid loss of important data, backups are performed on the computing systems and devices, so that when device failures or loss of data for other reasons occur, the lost data may be restored. However, traditional methods of backing up and restoring data is inefficient, slow, and uses much of the available network bandwidth.

SUMMARY

In general, certain embodiments described herein relate to a method for performing a restoration of selected assets from a backup. The method comprises receiving a request to perform the restoration of the selected assets from the backup, wherein the backup comprises of a plurality of assets associated with a file system and the selected assets are chosen from the plurality of assets. The plurality of assets is stored in a plurality of slices that are organized in a hierarchical structure that is based on the hierarchical structure of the file system. The method then includes retrieving, in response to the request, metadata for the backup comprising a mapping between the plurality of assets and the plurality of slices. Once the metadata is retrieved, one or more slices storing the selected asset are identified using the metadata and based on the identified one or more slices and the metadata for the backup, one or more containers storing the one or more slices comprising the selected assets are identified and the selected assets are restored from the one or more slices contained in the one or more containers.

In general, certain embodiments described herein relate to a non-transitory computer readable medium comprising computer readable program code, which when executed by a computer processor enables the computer processor to perform a method for performing a restoration of selected assets from a backup. The method comprises receiving a request to perform the restoration of the selected assets from the backup, wherein the backup comprises of a plurality of assets associated with a file system and the selected assets are chosen from the plurality of assets. The plurality of assets is stored in a plurality of slices that are organized in a hierarchical structure that is based on the hierarchical structure of the file system. The method then includes retrieving, in response to the request, metadata for the backup comprising a mapping between the plurality of assets and the plurality of slices. Once the metadata is retrieved, one or more slices storing the selected asset are identified using the metadata and based on the identified one or more slices and the metadata for the backup, one or more containers storing the one or more slices comprising the selected assets are identified and the selected assets are restored from the one or more slices contained in the one or more containers.

In general, certain embodiments described herein relate to a system comprising: one or more processors and at least one memory. The memory comprises instructions, which when executed by the processor, perform a method for performing a restoration of selected assets from a backup. The method comprises receiving a request to perform the restoration of the selected assets from the backup, wherein the backup comprises of a plurality of assets associated with a file system and the selected assets are chosen from the plurality of assets. The plurality of assets is stored in a plurality of slices that are organized in a hierarchical structure that is based on the hierarchical structure of the file system. The method then includes retrieving, in response to the request, metadata for the backup comprising a mapping between the plurality of assets and the plurality of slices. Once the metadata is retrieved, one or more slices storing the selected asset are identified using the metadata. Then, based on the identified one or more slices and the metadata for the backup, one or more containers storing the one or more slices comprising the selected assets are identified, and the selected assets are restored from the one or more slices contained in the one or more containers.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4 shows an example of backup storage containing slices in accordance with one or more embodiments of the invention.

DETAILED DESCRIPTION

Figure 1A:
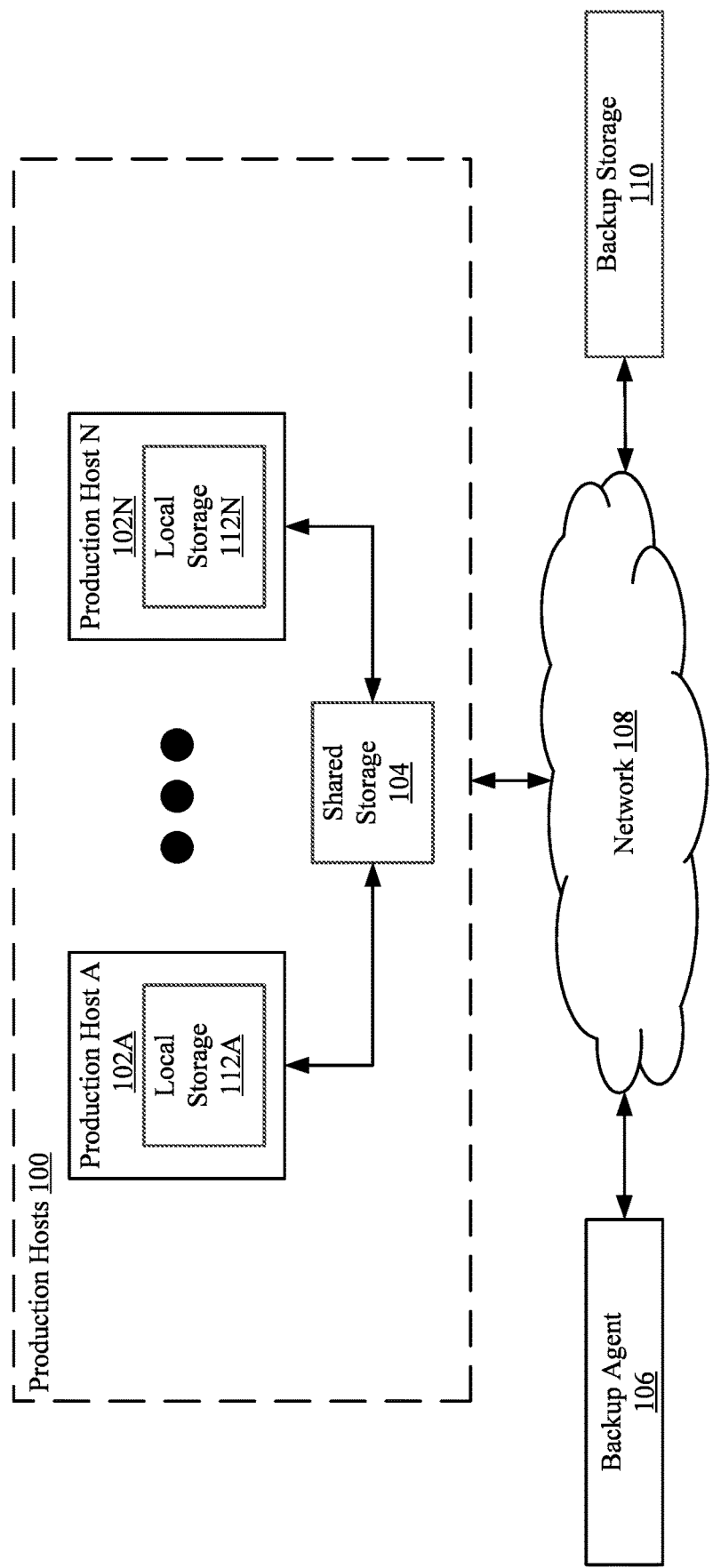
FIG. 1A shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may comprise any number of items, and does not require that the element comprise the same number of elements as any other item labeled as A to N. For example, a data structure may comprise a first element labeled as A and a second element labeled as N. This labeling convention means that the data structure may comprise any number of the elements. A second data structure, also labeled as A to N, may also comprise any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected," or "operative connection," means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In many traditional data protection and management solutions for client/server architectures, backups and restorations are inefficiently performed. Clients send a request for backing up desired assets such as files, folder, and/or data stored in a host or in other locations such as shared storage. When the request is received the host and/or the client crawls the files and/or folders over the network to get a list of the assets associated with the backup request. Once the assets are determined, they are sliced to form manageable slices, which are assigned to a plurality of network streams without consideration of the contents of the slices and/or streams.

Later when a request for a restoration of the desired assets from the backup is received, the traditional data protection and management solutions do not allow for easy recovery. The traditional method requires crawling the entirety of a backup in order to locate each asset at a granular level (such as individual files and folders that make the asset to be recovered). This takes considerable time to perform along with using excessive amounts of system resources such as processor resources and/or network resources.

In accordance with one or more embodiments of the invention, a restoration system leverages the backup metadata and a hierarchical arrangement of the slices and assets. By organizing the slices in a hierarchy that is based on that of the hierarchy at the time the backup was performed of the underlying assets (files and folders), one or more selected assets can be more efficiently discovered. In one or more embodiments of the invention, this hierarchy is stored along with mappings between the levels of slices and assets in the backup's metadata.

When a request for a specific asset is received, in accordance with the one or more embodiments, systems implementing embodiments of the invention only need to read the backup's metadata and follow the hierarchy in order to determine where each slice associated with the selected asset is stored. This, and other aspects of the one or more embodiments of the invention, results in better utilization of system and network resources as well as a better recovery performance.

The following describes various embodiments of the invention.

FIG. 1A shows a diagram of a system in accordance with one or more embodiments of the invention. The system comprises a group of production hosts (100). The group may comprise a plurality of production hosts (102A-102N) as well as any shared storage (104). The system may comprise any-number of hosts (e.g., 102A-102N) and while shown as one group of two hosts (102A and 102N), there may be any number hosts and the hosts may belong to any number of groups or being interrelated in any manner without departing from the invention. For example, the system may comprise six hosts configured as two groups (not shown) that communicate through a network (108).

The system also comprises a backup agent (106) which may perform backups and/or restoration of assets located on any of the production hosts (e.g., 102A-102N) and/or the shared storage (e.g., 104). The system may also comprise backup storage (110) for storing any number of backups. Both the backup agent (106) and backup storage (110) may be part of the same device including one or more production hosts (e.g., 102A-102N) or may be separate standalone systems. The system may comprise additional, fewer, and/or other components without departing from the invention. Each of the components in the system may be operatively connected via any combination of wireless and/or wired networks (108). Each component illustrated in FIG. 1A is discussed below.

In one or more embodiments of the invention, the production hosts (100) interact via a network (108) with one or more backup agents (e.g., 106). The backup agent (106) may be a separate computing system that coordinates backups and restorations and either comprises or communicates with a backup storage (e.g., 110) for storing a completed backup and other data. Alternatively, or in addition to, in one or more embodiments of the invention, the backup agent may be part of any of the production hosts (e.g., 102A-102N) or other components of the production hosts (100) or the system. Other configurations of the backup agent (e.g., 106) and the production hosts (100) may be utilized without departing from the invention.

In one or more embodiments of the invention, the backup agent (106) may generate and provide to the backup storage device (110) backup data, backup metadata, as well as any other data that is produced by the backup agent (106) in the process of performing a backup based on backup policies implemented by the backup agent (106). The backup agent may also perform restoration from the backup, backup metadata, and any other data that is associated with a backup. The backup policies may specify a schedule in which assets associated with the production hosts (e.g., 102A-102N) are to be backed up. The backup policies or separate restoration policies may also specify how to perform a restoration of the backup. The backups may take the form of either a full or incremental backup as well as any other type of backup.

The backup agent (106) may be triggered to generate a backup along with backup metadata and provide the backup and its metadata to the backup storage device (110) in response to a backup policy. Alternatively, backup, and backup metadata may be generated by the backup agent (106) and provided to the backup storage device (114) in response to a backup request triggered by a client (not-shown) or user of the system. The method of backing up an asset comprising of files and folders is described in more detail below with regards to the methods shown in FIGS. 2 and 3.

In one or more embodiments of the invention, the backup agent (106) stores backup data on backup storage (e.g., 110). The backup storage (110) may store data and/or files such as backup data, metadata, as well as definitions rules, procedures, and other pertinent information for performing backups of the production hosts (e.g., 102A-102N). The backup storage (110) may comprise one or more processors, memory (e.g., random access memory), and persistent storage (e.g., disk drives, solid state drives, etc.). In one or more embodiments of the invention, the backup storage (110), as well as the backup agent (106) itself, may also, or alternatively, comprise of off-site storage including but not limited to, cloud base storage, and long-term storage such as tape drives, depending on the particular needs of the user and/or the system.

In one or more embodiments of the invention, the backup agent (106) stores assets that have been selected for backing up. The assets may take the form of one or more files and/or folders that are stored on the production hosts (100). The assets may be stored as backup data in a hierarchical organization similar to that of the file-system from which the backup data is backed up. See e.g., example in FIG. 4.

In one or more embodiments of the invention, the backup data is in the form of slices which are stored in the backup storage (110) in a hierarchical organization that is derived from that of the organization of the file-system that the slices are obtained from. In one or more embodiments of the invention the slices are stored in a plurality of containers located on the backup storage (110) with a mapping in the backup metadata that determines where in each container a particular slice is stored. See e.g., example in FIG. 4. Other methods of storing the backup data can be used without departing from the invention.

In one or more embodiments of the invention, the backup agent (106) is a physical device. The physical device may comprise circuitry. The physical device may be, for example, a field-programmable gate array, application specific integrated circuit, programmable processor, microcontroller, digital signal processor, or other hardware processor. The physical device may be adapted to provide the functionality of the backup agent (106) described throughout this application.

In one or more embodiments of the invention, the backup agent (106) may restore the backup metadata and backup data stored in the backup storage (110). While described as being performed by a backup agent (e.g., 106), restorations may be performed by a separate restoration agent (not shown) or any other component or agent that has access to both backup storage (110) and the production hosts (100). When the backup agent (106) or other equivalent component of the system, receives a request for a restoration of a backup, the backup agent (106) or equivalent component, retrieves the metadata and data stored in the backup storage (e.g., 110) and restores the data to its original location in the production hosts (e.g., 102A-102N). Alternatively, in one or more embodiments of the invention, the data in the backup may be restored to a file-system located in a different production host than where it was originally restored as directed by a user, administrator, or other party that requested the restoration.

In one or more embodiments of the invention, when the assets are stored in the form of slices having a hierarchical organization that is derived from that of the organization of the file-system from which the slices are obtained, the restoration allows for efficient searching and restoring of the selected assets. The backup metadata can be used to locate the slices in the individual containers in the backup storage. The method of restoring one or more selected assets is described in more detail below in methods shown in FIGS. 2 and 3.

Figure 5:
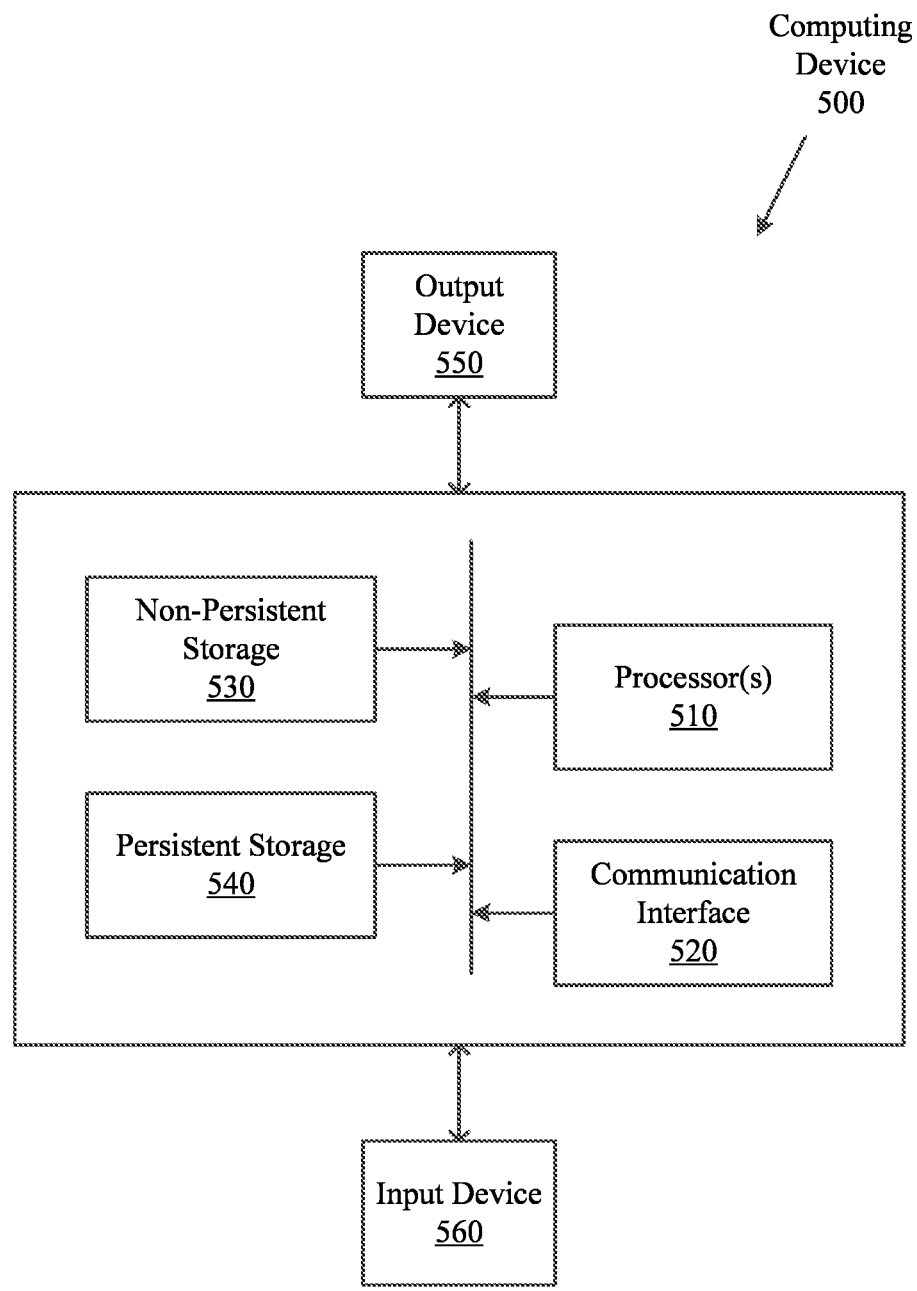
FIG. 5 shows a diagram of a computing device in accordance with one or more embodiments of the invention.

In one or more embodiments of the invention, the backup agent (106) is implemented as a computing device (see e.g., FIG. 5). A computing device may be, for example, a mobile phone, tablet computer, laptop computer, desktop computer, server, distributed computing system, or cloud resource. The computing device may comprise one or more processors, memory (e.g., random access memory), and persistent storage (e.g., disk drives, solid state drives, etc.). The computing device may comprise instructions stored on the persistent storage that when executed by the processor(s) of the computing device cause the computing device to perform the functionality of a backup agent (e.g., 106) described throughout this application.

In one or more embodiments of the invention, the backup agent (106) is implemented as computer instructions, e.g., computer code, stored in a persistent storage that when executed by a processor of the production hosts (e.g., 102A-102N) causes the production hosts (e.g., 102A-102N) to provide the functionality of the backup agents (e.g., 106) described throughout this application. Alternatively, in one or more embodiments of the invention, the backup agent (106) may be implemented on the production host, a client (not shown), or other component of the system, which may provide the functionality of the backup agent (106) described throughout this application.

In one or more embodiments of the invention, the production hosts (100), shared storage (104), the backup agent (106), and backup storage (110) communicate through a network (108). The network (108) may take any form including any combination of wireless and/or wired networks. The network (108) may be a local network (LAN), or a wide area network (WLAN), including the Internet or a private enterprise network that connects more than one location. The network (108) may be any combination of the above networks, other known network, or any combination of network types.

In one or more embodiments of the invention, the network (108) allows the production hosts (100) to communicate with other production hosts and other external computing devices such as, but not limited to, a client and/or a backup agent (e.g., 106). The production hosts (100) may also communicate with each other through a network. The network may be a high-speed internal network and/or comprise part of an external network (e.g., 108). The production hosts (100), and shared storage (104) may alternatively, or additionally, communicate with each other over an internal network.

A network (e.g., 108) may refer to an entire network or any portion thereof (e.g., a logical portion of the devices within a topology of devices). A network (e.g., 108) may comprise a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with, or overlap, at least in part, with the Internet.

In one or more embodiments, although shown separately in FIG. 1A, the network (108) may comprise any number of devices within any components (e.g., 100, 102A-102N, 104, 106, and 110) of the system, as well as devices external to, or between, such components of the system. In one or more embodiments, at least a portion of such devices are network devices (not shown). In one or more embodiments, a network device is a device that comprises and/or is operatively connected to persistent storage (not shown), memory (e.g., random access memory (RAM)) (not shown). A network device may also comprise one or more processor(s) (e.g., integrated circuits) (not shown), and at least two physical network interfaces, which may provide connections (i.e., links) to other devices (e.g., computing devices, other network devices, etc.). In one or more embodiments, a network device also comprises any number of additional components (not shown), such as, network chips, field programmable gate arrays (FPGAs), application specific integrated circuits (ASICs), indicator lights (not shown), fans (not shown), etc. A network device may comprise any other components without departing from the invention. Examples of a network device comprise, but are not limited to, a network switch, a router, a multilayer switch, a fibre channel device, an InfiniBand® device, etc. A network device is not limited to the aforementioned specific examples.

In one or more embodiments of the invention, the network (e.g., 108) supports (or otherwise enables) components such as the production hosts (e.g., 102A-102N) and the backup agent (e.g., 106) to communicate using one or more streams. Any particular communication may have one or more streams assigned to it, with a maximum number of streams being preconfigured as a consequence of the network's design. Each stream has a maximum throughput, which is the maximum amount of data that may be sent between two components during a period of time given network conditions. The total number of streams that may be used is dependent on the capabilities of the network and components as well as the total throughput. Each stream utilizes part of the total bandwidth, thus when more streams are applied, each stream has a lower total throughput.

One or more embodiments of the invention, comprises a plurality of production hosts (e.g., 102A-102N) which comprise the functionality to obtain data protection services from a data protection manager (not shown) or the backup agent (e.g., 106). While shown as containing only two production hosts (e.g., 102A-102N), the production hosts (100) may comprise more or less production hosts without departing from the invention. For example, a group of production hosts (e.g., 100) may comprise at least sixteen production hosts, at least fifty production hosts, or at least a hundred production hosts without departing from the invention.

Each production host (also referred to as host) (e.g., 102A-102N) comprises local storage (e.g., 112A-112N) for storing assets such as files and folders which may be made available to other hosts or requesting target devices such as the backup agent (e.g., 106). The local storage (e.g., 112A-112N) may comprise one or more processors, memory (e.g., random access memory), and persistent storage (e.g., disk drives, solid state drives, etc.). In one or more embodiments of the invention, the local storage (e.g., 112A-112N) may communicate or utilize off-site storage including, but not limited to, shared storage (104), cloud base storage, and long-term storage such as tape drives, depending on the particular needs of the user and/or the system.

The production hosts (100) may utilize shared storage (104), e.g., network attached storage (NAS). Other types of shared storage may also or alternatively be comprised such as active-passive storage and other kinds of shared storage.

The shared storage may communicate with each of the production hosts by high-speed network or other dedicated communication means. In one or more embodiments of the invention, the shared storage may be used instead of the local storage (e.g., 112A-112N) or may be used in concert with the local storage (e.g., 112A-112N). The share storage may also be used as the backup storage (e.g., 110).

The local storages (e.g., 112A-112N) and/or shared storage (e.g., 104) may comprise any number of storage volumes without departing from the invention. The storage volumes may be physical storage devices and/or logical storage devices. The physical storage devices may comprise any combination of hard disk drives, solid state disk drives, tape drives, and/or any other physical storage mediums for data.

The logical storage devices may utilize any quantity of hardware storage resources of any number of computing devices for storing data. For example, the local and shared storages (e.g., 112A-112N, 104) may utilize portions of any combination of hard disk drives, solid state disk drives, tape drives, and/or any other physical storage mediums for any number of computing devices.

In one or more embodiments of the invention, the production hosts (e.g., 102A-102N) perform workloads and provide services to clients and/or other entities not shown in the system illustrated in FIG. 1A. The production hosts (e.g., 102A-102N) may further comprise the functionality to perform computer implemented services for users (e.g., clients, not shown). The computer implemented services may comprise, for example, database services, electronic mail services, data processing services, etc. The computer implemented services may comprise other and/or additional types of services without departing from the invention.

During the performance of the services described above, data may be generated and/or otherwise may be obtained. The various data storage volumes (e.g., 112A-112N and 104) may be used during the performance of the services described above, by performing data storage services including storing, modifying, obtaining, and/or deleting data. The data storage services may comprise other additional services without departing from the invention.

The data generated and stored on the local storages (e.g., 112A-112N) and shared storage (e.g., 104) by the production hosts (e.g., 102A-102N) may be valuable to users of the system, and therefore may be protected by the backup agent (e.g., 106). The production hosts (e.g., 102A-102N), alternatively or in addition to the backup agent (e.g., 106) may provide backup storage services and comprise backup storage on the local storage (e.g., 112A-112N) and/or shared storage (e.g., 104). The backup storage services may comprise storing backups of data stored on the shared storages for restoration purposes. The backup storage services may comprise other and/or additional services without departing from the invention.

In one or more embodiments of the invention, the production hosts (e.g., 102A-102N) are implemented as computing devices (see e.g., FIG. 5). A computing device may be, for example, a mobile phone, tablet computer, laptop computer, desktop computer, server, distributed computing system, or cloud resource. The computing device may comprise one or more processors, memory (e.g., random access memory), and persistent storage (e.g., disk drives, solid state drives, etc.). The computing device may comprise instructions, stored on the persistent storage, that when executed by the processor(s) of the computing device cause the computing device to perform the functionality of the production hosts (100) described throughout this application.

In one or more embodiments of the invention, the production hosts (100) are implemented as logical devices. The logical devices may utilize the computing resources of any number of computing devices and thereby provide the functionality of the production hosts (100) described throughout this application.

Figure 1B:
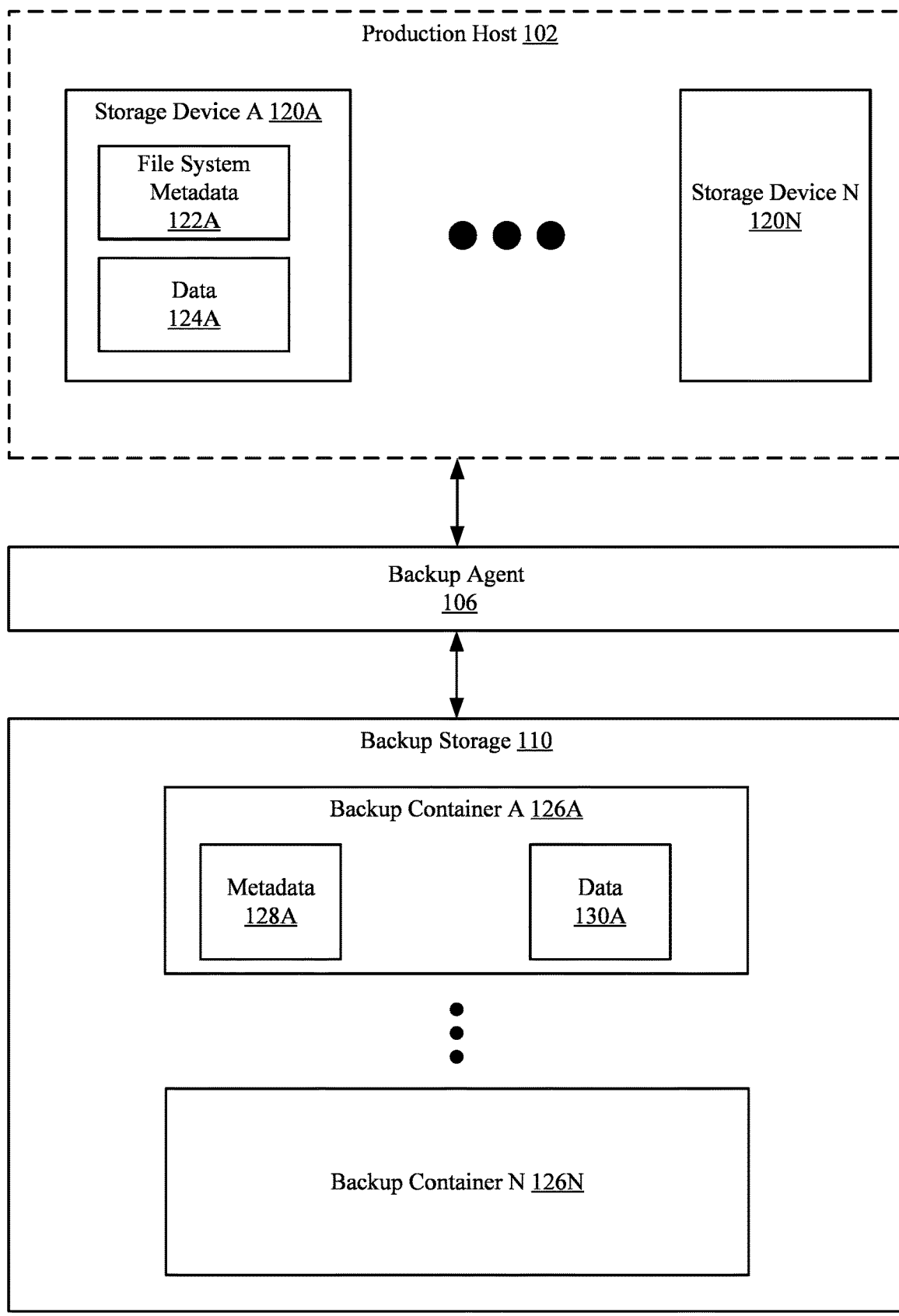
FIG. 1B shows a detailed diagram of a system for restoring a production host in accordance with one or more embodiments of the invention.

Turning now to FIG. 1B, FIG. 1B shows a diagram of specific components utilized in performing a backup and/or restoration of a user defined logical asset located on at least one production host (e.g., 102) by a backup agent (e.g., 106) in accordance with one or more embodiments of the invention. The production host (e.g., 102) communicates with one or more backup agents (e.g., 106) and related backup storage (e.g., 110). Each component illustrated in FIG. 1B is discussed below.

The production host (e.g., 102) may be similar to the production hosts (e.g., 100) as discussed above in reference to FIG. 1A. The production host (e.g., 102) may comprise VMs, a hypervisor, a production agent, and local storage that comprises a plurality of storage devices (e.g., 120A-120N). The production host may comprise additional, fewer, and/or different components without departing from scope of the invention. Each component may be operably connected to any of the other components via any combination of wired and/or wireless connections.

As discussed above, the production host may provide computer implemented services to clients as well as the backup agent(s) (e.g., 106). To provide and obtain the aforementioned computer implemented services, the production host (e.g., 102) may comprise application(s) which are stored on storage devices (e.g., 120A-102N). The production host may comprise other and/or additional components without departing from the invention.

The production host (e.g., 102) comprises storage devices, (e.g., 120A and 120N). The storage devices (120A-120N) may be in the form of the local storage devices (e.g., 112A-112N, FIG. 1A), shared storage (e.g., 104, FIG. 1A), or a combination of both local and shared storage devices (e.g., 112A-112N, 104, FIG. 1A). The storage devices, (e.g., 120A and 120N) may, alternatively or additionally, comprise storage devices located remotely from the production host (102) such as, but not limited to, cloud and edge storage, and other forms of external storage.

The storage devices may comprise a file system metadata repository (e.g., 122A) and data (e.g., 124A). A file system metadata repository (e.g., 122A) may be one or more data structures that comprises information regarding application data stored in the file system repository. The information comprised in the file system metadata repository (e.g., 122A) in one or more embodiments of the invention may be determined as a normal function of the file system in each storage device (e.g., 120A-120N). This information may also be determined as part of a metadata-based backup (MBB), or other functions requested by the backup agent (e.g., 106) or other components of the system.

Figure 2:
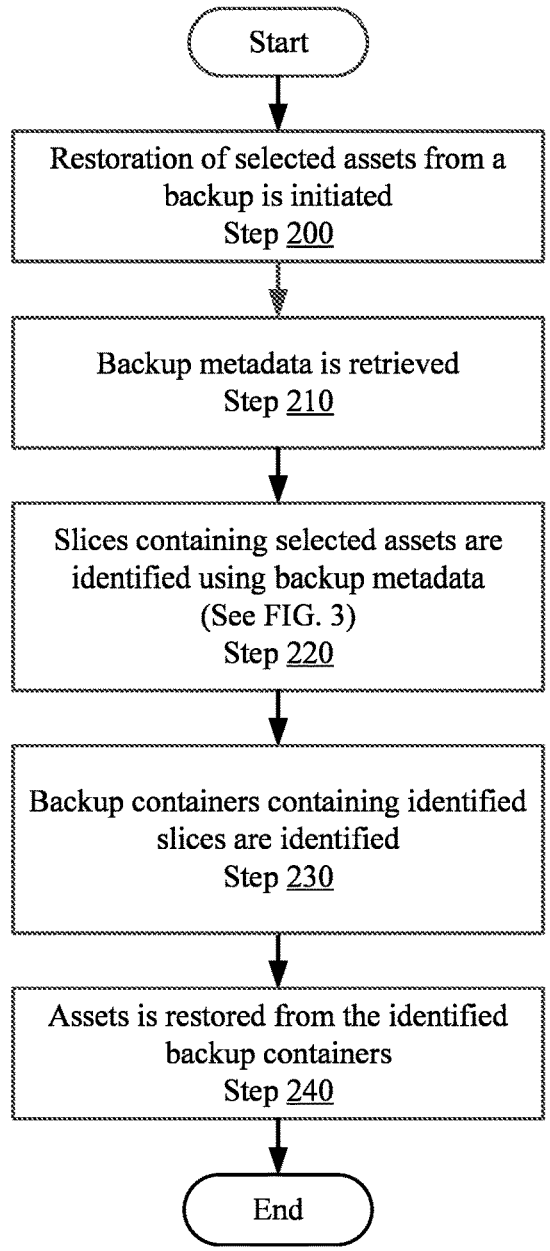
FIG. 2 shows a flowchart of a method of restoring selected assets in accordance with one or more embodiments of the invention.
Figure 3:
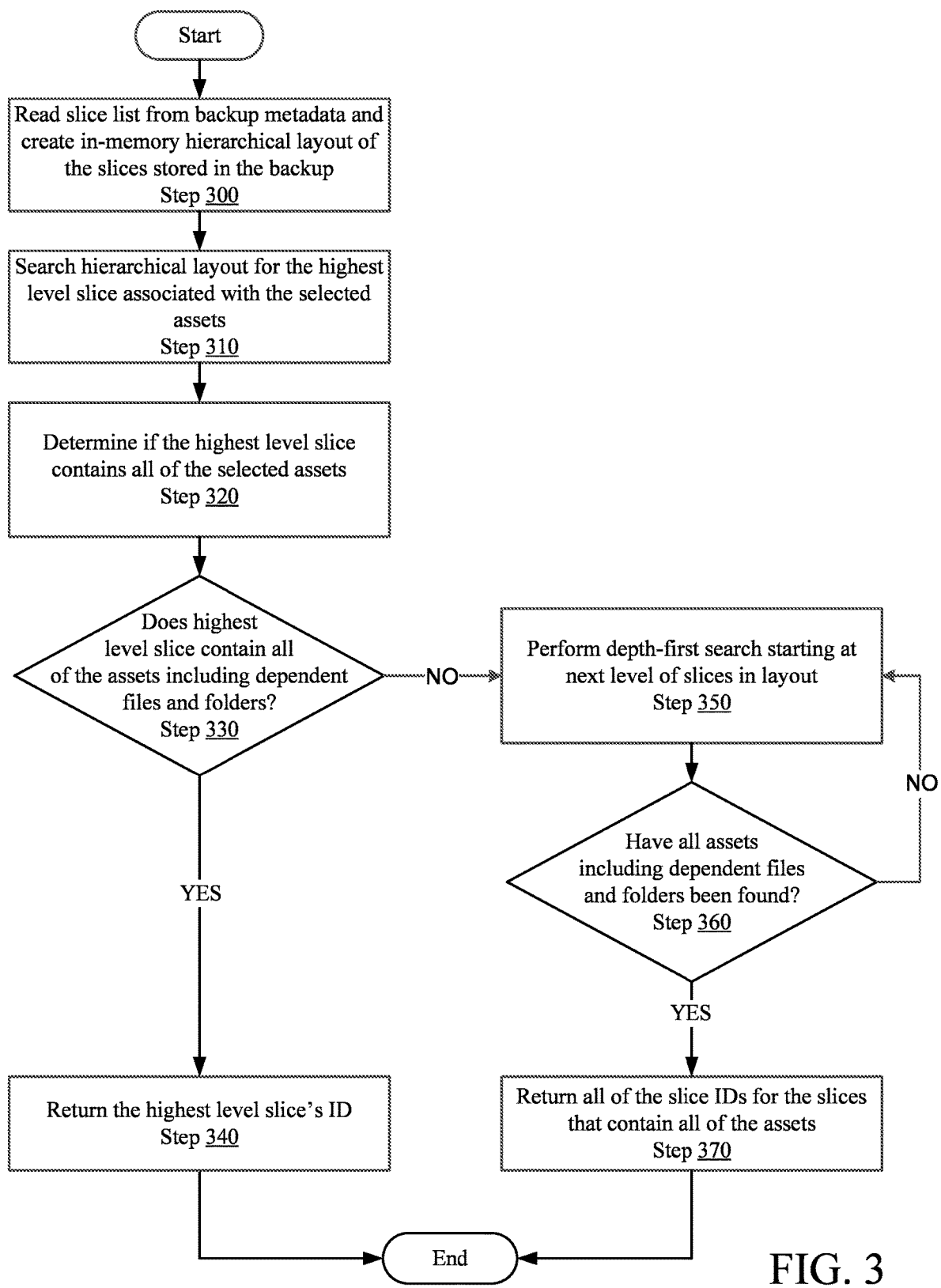
FIG. 3 shows a flowchart of a method of identifying slices containing selected assets in accordance with one or more embodiments of the invention.

The information comprised in the file system metadata repository (e.g., 122A) in one or more embodiments of the invention may be used for determining the files and folders that are associated with an asset, producing estimates of the size of files and folders associated with the asset, organizing and determining a hierarchical organization of the files and folders that are associated with an asset, and/or other functions such as performing backups and/or restorations of the assets, including restorations performed as will be described in more detail with regards to the methods shown in FIGS. 2 and 3. The file system metadata repository (e.g., 122A) may comprise additional information without departing from the invention.

The storage devices (e.g., 120A-120N), may comprise one or more data structures (e.g., 124A) that may comprise the assets, such as actual data associated with one or more applications. The storage devices (e.g., 120A-120N) may comprise assets such as data (e.g., 124A) generated by the production host (e.g., 102). The assets and corresponding data may be any type of data such as, but not limited to, database data and email data generated by applications and/or their users. Each storage device (e.g., 120A-120N) may comprise any number of applications and associated data as well as data not associated with a specific application. In one or more embodiments of the invention, the data (e.g., 124A-124N) is in the form of files and folders and each asset comprises of files and folders that are either related to a specific application, are stand alone, or are related to a specific criteria defined by a user or administrator at the time that a backup or restoration is requested.

Users (e.g., individuals, administrators, or their proxies) operating or using the system may use the assets/data (e.g., 124A), stored on the storage devices (e.g., 120A-120N), when obtaining computer implemented services from the production host (e.g., 102). Additionally, the assets/data (e.g., 124A), stored on the storage devices (e.g., 120A-120N) of the production host (e.g., 102), may be obtained by a backup agent (e.g., 106) or other requesting device (not shown) to perform functions related to the backup agent or other requestion device. The assets/data (e.g., 124A) of the storage devices (e.g., 120A-120N), may be used by other and/or additional entities for other and/or additional purposes without departing from the invention.

In one or more embodiments of the invention, the backup agent (106) as described in more detail above with regards to FIG. 1A, receives requests for backups and restorations. After receiving such requests, the backup agent (106) then requests assets from the production host (e.g., 102) or backup storage (e.g., 110) as appropriate. The request may be communicated through an intermediary such as the network (e.g., 108) or directly such as the case when the backup agent is part of the production host (102) and/or backup storage (110). In one or more embodiments of the invention, the backup agent (106) communicates with the backup storage (e.g., 110) which stores the backup data (e.g., 130A) in the form of slices in a plurality of containers (e.g., 126A-126N).

The backup agent (106) may take the form of a physical device that may comprise circuitry. The physical device may be, for example, a field-programmable gate array, application specific integrated circuit, programmable processor, microcontroller, digital signal processor, or other hardware processor. The physical device may be adapted to provide the functionality of the backup agent (e.g., 106) as described throughout this application. In one or more embodiments of the invention, the backup agent (106) is implemented as computer instructions, e.g., computer code, stored on a persistent storage that when executed by a client or user, causes a processor to provide the functionality of a backup agent (e.g., 106).

In one or more embodiments of the invention, the backup agent (106) or other equivalent components of the system determines how to slice an asset that is requested by the backup request. When a backup is requested for an asset located on a production host (e.g., 102), such as in one or more of its storage devices (e.g., 120A-120N), the backup agent (106) utilizes the file-system metadata (e.g., 122A) located on the production host (e.g., 102) to determine where the asset is located, the type of asset, and how large the asset is. In one or more embodiments of the embodiment, if the backup is an incremental backup, this information may instead or in addition be obtained from the previous backup's metadata (128A).

At the same time, the backup agent (e.g., 106) reads slicing parameters such as the command to perform the backup from a configuration file or other source. The configuration file may be stored on storage associated with the backup agent (e.g., 106), in the storage device (e.g., 120A) of the production host (e.g., 102), or it may be provided by a requesting device such as a client device (not shown) when it requests the backup to be performed. The slicing parameters may comprise such information as a standard size for the slices along with a predetermined tolerance for differences from that standard size, instructions for trimming the metadata/files associated with the asset, such as but not limited to, eliminating files that are not necessary for utilizing the asset (for example "readme files"). The slicing parameters, in accordance with one or more embodiments of the invention may also comprise a predetermined number of slices to use and other criteria such as the number of slices per stream. Other information may be comprised in the slicing parameters without departing from the invention.

Based on the metadata for the asset(s) and slicing parameters, the backup agent (e.g., 106) may then assign assets in the form of files or portions of files, to individual slices. The backup agent (e.g., 106) assigns the assets in the form of files, folders, or portions thereof to the slices, based on the criteria in the slicing parameters. In one or more embodiments of the invention, the files may be assigned in such a way that each slice has an equal size within a predetermined tolerance. This tolerance may be plus or minus a percentage that is specified in the slicing parameters and/or specified by a client, a user, or an administrator at the time that the asset is requested. Some examples of a tolerance are ≤±1%, ±5%, or ±10%. Other percentages and/or ranges may be used without departing from the invention.

Once the assets such as files, folders, or portions of them are assigned to their specific slices, the backup agent (e.g., 106) may save the metadata which may comprise an indication of the type of slice, as well as the specific assets such as files and folders that form the slice. Alternatively, or in addition, a slice list may be produced which maps each asset to a specific slice and indicates the type of slice. In one or more embodiments, the slices are organized with a hierarchical structure that is similar to the hierarchical structure of the file system where the assets were originally located. The slice list may be saved in the backup storage (110) or in one or more of the storage devices (e.g., 120A) associated with the production host. Other locations may be used without departing from the invention.

The backup agent (e.g., 106), utilizing network telemetry and the file system metadata (e.g., 122A), may then assign the slices to individual network streams based on the characteristics of the slices. In accordance with one or more embodiments of the invention, the backup agent (e.g., 106) assigns each asset in the form of slices to a specific stream based on predetermined criteria and current device and network configurations and telemetry. The individual streams are assigned by the backup agent (106) or a data mover (not shown), which may be a part of the backup agent (e.g., 106), network (e.g., 108, FIG. 1A), backup storage (e.g., 110), or other component of the system, and queued to use available connections between the production host (102), backup agent (106), and backup storage (110).

In one or more embodiments of the invention, the backup storage device (e.g., 110) stores each stream in its own backup container (e.g., 126A-126N) without putting the streams, slices, files, and/or folders. In one or more embodiments of the invention, each container has its own metadata (e.g., 128A) that maintains the mapping between the data (e.g., 130A) stored in a container (e.g., 126A-126N) in the form of slices and its original location on the storage devices (e.g., 120A-120N). In one or more embodiments of the invention, alternatively, a single metadata file (e.g., 128A) may be used to store the mapping between all the data (e.g., 130A) generated in the backup, its original location in the file system hierarchy, which slices the data is stored in and where each of those slices are stored in the multiple containers (e.g., 126A-126N).

In accordance with one or more embodiments of the invention, when a restoration is requested at a later time, the backup agent (e.g., 106) retrieves the metadata (e.g., 128A) and determines which slices one or more selected assets are stored on by searching the hierarchical listing/structure of the slices, as described in more detail below with regards to the method shown in FIG. 3.

Once the slice(s) are determined, the method uses the metadata to determine which container includes each slice. The correspondence between each slice and the container storing it may be determined by using a slice ID for each slice and looking up that slice ID on a mapping between the slices and the containers stored in the metadata. The method of locating specific containers storing specific slices is described in more detail below with regards to the method shown in FIG. 2.

Without reorganizing the data on the backup storage (e.g., 110) or crawling the entirety of the backup data in the backup storage, the backup agent (106) restores the files and folders of the selected asset(s) to their original file system on the storage devices (e.g., 120A-120N) of the production host (e.g., 102). The file and folders, in accordance with one or more embodiments of the invention, may alternatively be restored to a new or alternative location on the production hosts (e.g., 102), including on a new production host, or even a new group (e.g., 100, FIG. 1A). Other methods for restoring the backup may be used and the invention is not limited to those described above.

The backup storage (e.g., 110) may comprise storage devices (not shown) for storing data. The storage devices may be physical storage devices and/or logical storage devices. The physical storage devices may comprise any combination of hard disk drives, solid state disk drives, tape drives, and/or any other physical storage mediums for the storage of data. The backup storage devices may utilize any quantity of hardware storage resources of any number of computing devices for storing data. For example, the backup storage (e.g., 110) may utilize portions of any combination of hard disk drives, solid state disk drives, tape drives, and/or any other physical storage medium of any number of computing devices. The backup storage (e.g., 110) may additional be part of the storage devices (e.g., 120A) located on the production host (e.g., 102).

FIG. 2 shows a method of restoring selected assets stored in backup storage (e.g., 110, FIG. 1A) to a one or more production hosts (e.g., 102A-102C, FIG. 1A) in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

The method of FIG. 2 may be performed by, for example, a backup agent (e.g., 106, FIG. 1B), a separate restoration agent (not shown), or an individual production host (e.g., 102, FIG. 1B). Other components of the system illustrated in FIGS. 1A and 1B may perform all or a portion of the method of FIG. 2 without departing from the invention.

In step 200, the system receives a request for a restoration of selected assets stored in a backup performed on assets of a production host. The request for the restoration may be from a full backup or incremental backup. The request may comprise all of the assets in the backup or only a selection that is less then all of the assets stored in the backup. The request may come from a user, an administrator, or an application hosted by one or more of the production hosts (e.g., 102A-102N, FIG. 1A). The request may comprise instructions for what assets to restore and how to perform the (such as, but not limited to, where to restore the assets to, how many streams to use, when to perform the restoration, etc.).

Once the request for the backup of the asset is received, the method proceeds to step 210, where the metadata form the backup is retrieved. In one or more embodiments of the invention the backup metadata is stored with the backup data in the backup storage (e.g., 110, FIG. 1B). The backup metadata may take the form of individual metadata (e.g., 128A, FIG. 1B) associated with each backup container (e.g., 126A-126N, FIG. 1B) or there may be one combined metadata associated with the backup. When the restoration is requested, all the associated metadata (e.g., 128A, FIG. 1B) are retrieved and if there are more than one, combined. The metadata and/or combined metadata is then parsed to obtain mappings between the containers, slices, assets, and original location in the file system of one or more production hosts (e.g., 100, FIG. 1A).

Once the metadata is retrieved in step 210, the method proceeds to step 220 where the slices storing the selected assets are identified using the retrieved metadata. In one or more embodiments of the invention, this is done as described below with regards to the method shown in FIG. 3 (described below). Once the slices are identified, in one or more embodiments of the invention, slice IDs are returned which can be used in step 230 to identify the appropriate containers containing the identified slices. Other methods of identifying the slices and their container methods can be used without departing from the invention.

In step 230, the backup containers containing the identified slices are identified using the mappings stored in the backup metadata. Each slice may be stored in a single backup container (along with other potentially unrelated slices). The slices associated with the selected asset may be stored in one or a plurality of backup containers. By using the slice ID, the container mapping can be quickly ascertained for each slice.

Once these backup containers are identified the assets are restored using the slices stored in the identified backup containers. The slices are retrieved by the backup agent or other related component, and the underlying hierarchical organization of the files and folders forming the assets and slices are restored on the appropriate production host(s) (e.g., 102A-102N, FIG. 1A) or shared storage (e.g., 104, FIG. 1A).

The method of FIG. 2 may end after step 240.

FIG. 3 shows a method of identifying the slices associated with selected assets in accordance with one or more embodiments of the invention. While the various steps in the method are presented and described sequentially, those skilled in the art will appreciate that some or all of the steps may be combined, omitted, executed in different orders, or some or all steps may be executed in a parallel manner without departing from the scope of the invention.

The method of FIG. 3 may be performed by, for example, a backup agent (e.g., 106, FIG. 1B), a restoration agent (not shown), or an individual production host (e.g., 102A-102N, FIG. 1A). Other components of the system illustrated in FIGS. 1A and 1B may perform all, or a portion of the method of FIG. 3 without departing from the invention.

In step 300, the slice list and mapping between the slice list and the assets are read from the backup metadata (see e.g., Table 1). This slice list and mapping is then used to create an in-memory hierarchical layout (also referred to as layout) of the slices stored in the backup. The in-memory hierarchical layout may be produced in the memory of the backup agent (e.g., 106, FIG. 1B) or other location as appropriate. The layout may be in the form or similar to that shown in FIG. 4 (e.g., 400). The layout, in step 310, can be searched from top to bottom and left to right to locate the highest-level slice that includes the asset. The leftmost slice and the topmost slice in one or more embodiments of the invention is considered the highest-level slice. As determined in step 320, the highest-level slice may or may not include all of the selected assets.

The method proceeds to step 330 where search initially locates the highest-level slice ID that includes at least a portion of the file system path to of the selected asset(s). During the search, if the highest-level slice directly includes all the assets, the method proceeds to step 340. In step 340 the highest-level slice's ID is returned and used for determining the appropriate container and restoring the selected assets. The method then ends after step 340.

If, however, the highest-level slice does not contain all of the assets, the method continues a depth-first search in the in-memory hierarchical layout based on the highest-level slice ID that includes at least a portion of the file system path to of the asset in step 350. Under each level of the slices, there may be one or more additional levels and one or more slices. Each slice and slice level under the highest-level slice may contain selected assets or only some of the slices and slice levels under the highest-level slice may contain the selected assets. For example, where the highest-level slice is a directory slice/placeholder slice (while it includes assets needed to restore the selected assets), there could be slices in the next level directed towards user files, such as but not limited to, one or more databases, etc. If the selected asset is one database, then the highest-level slice (director slice) and the database slice would be the only slices needed. Other combinations of slices and assets can be used without departing from the invention.

If all the assets including dependent files and folders in step 360 are found, the method proceeds to step 370 and all of the slice IDs for the slices that contain all of the assets is returned in step 370. If, however, all assets have not been found in step 360, the method proceeds to step 350 where the depth-first search continues on next level of the layout. Steps 350 and 360 repeat until all assets are found or all levels of the slices has been searched.

The method of FIG. 3 may end after either step 340 or 370.

Example

FIG. 4 shows a non-limiting example of a system that performs the methods described above in FIGS. 2 and 3. The system in the example, in accordance with one or more embodiments of the invention, comprises a hierarchical slice layout (400) and two or more backup containers (e.g., 410A-410N). The slice layout (400) shows the hierarchical relationship between fourteen slices; however, the slice layout (400) is not limited to only fourteen slices and there can be any number (N) of additional slices. The fourteen slices are distributed across the two backup containers (410A and 410B) which are not necessarily in the same order as shown in the slice layout (400).

In a non-limiting example, the metadata for the backup contains two tables: Table 1 and Table 2 shown below. Table 1 shows the mapping between the slices and corresponding assets in the form of files and folders. Table 2 shows the mapping between each slice and the backup container (e.g., 410A and 410B) that contains them. The tables are only for exemplary purposes and the number of slices, assets and containers is exemplary only, a real backup can contain more or less slices, assets, and containers. The data included in Tables 1 and 2 can also be recorded in metadata in a different form.

TABLE 1

Slice to asset mapping

| Slice ID | Slice type | Related Assets | Parent Slice | Child Slices |
|---|---|---|---|---|
| 1 | Placeholder/directory | F:\\ and virtual disk 2 | None | None |
| 2 | Placeholder/directory | H:\\ | None | 3-8 |
| 3 | Equitable/data | H:\\directory 1; files 1 and 2 | 2 | None |
| 4 | Mixed | H:\\directory 2; sub-folders 1 and 2; and files 3-15 | 2 | 5 |
| 5 | Equitable/data | File 16 | 4 | None |
| 6 | Placeholder/directory | H:\\directory 3; sub-folders 3-10 | 2 | 7 |
| 7 | Equitable/data | File 17 | 6 | None |
| 8 | Equitable/data | Files 18-50 | 6 | None |
| 9 | Placeholder/directory | G:\\ and virtual disk 2 | None | None |
| 10 | Placeholder/directory | J:\\ | None | 11-15 |
| 11 | Mixed | Files 60-99; sub-folders 1 and 2 of J:\\ | 10 | 12-14 |
| 12 | Equitable/data | Files 100-200 for sub-folder 1 of J:\\ | 10, 11 | None |
| 13 | Equitable/data | Files 200-250 for sub-folder 1 of J:\\ | 10, 11 | None |
| 14 | Equitable/data | Files 260-500; folders 1-5 of sub-folder 2 of J:\\ | 10, 11 | None |

TABLE 2

Slice to container mapping

| Slice ID | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Container Number | 1 | 2 | 2 | 2 | 2 | 2 | 2 | 2 | 1 | 1 | 1 | 1 | 1 | 1 |

When the method is performed, a user requests the specific assets they want restored. In one non-limiting example, the user requests files 18-30 restored, which are/were contained in H:\\directory_3\subfolder_5 and H:\\directory_3\subfolder_6. When the request is received, the backup agent (e.g., 106, FIG. 1B) or related devices produces the hierarchical slice layout (400) in-memory using the data from Table 1.

The backup agent (e.g., 106, FIG. 1B) searches the layout from down the left most side to find the slice that contains the H:\\. The backup agent (e.g., 106, FIG. 1B), in the example, then determines that slice 2 contains directory information for H:\\. However, the backup agent (e.g., 106, FIG. 1B) when analyzing the metadata for slice 2 (as shown in Table 1), determines that slice 2 does not contain all of the selected assets. Accordingly, the backup agent (e.g., 106, FIG. 1B) then searches slices 3, 4, and 6 (because they are the child slices of slice 2) until the assets are found. Because the layout is organized in a hierarchical manner that follows file system hierarchy, the backup agent only needs to search slices that are child slices of slice 2 as these slices would be the only slices that have assets related to directory H:\\. Said another way, because of the layout, the backup agent is able to efficiently identify the highest-level slice (slice 2 in this example) that contains at least a portion of the file system path to the selected. In this example, the file system path to the assets is H:\\directory_3\subfolder_5 and H:\directory_3\subfolder_6 and slice 2 has H:\\, thus only slice 2 and its child slices (i.e., 3-8) need to be analyzed as they are only slices that could include the selected assets. The other slices (i.e., slices 9-14) do not need to be analyzed because they would not include any portion of the file system path to the selected assets.

Continuing with the example, sub folders 5 and 6 are found in directory information stored in slice 6. The backup agent (e.g., 106, FIG. 1B) then determines that slice 6 also does not include all of the selected assets (i.e., files 18-30). The backup agent (e.g., 106, FIG. 1B) then searches slices 7 and 8 (which are child slices of slice 6). Files 18-30 are found in slice 8 and therefore the system returns the slice IDs for slices 2, 6, and 8 which contain all the assets, as well as the folder/directory information for where the assets were backed up form.

The backup agent (e.g., 106, FIG. 1B) then uses Table 2 to determine where the assets are located in the backup storage device. Slice 2 is found in container 2 (e.g., 410B) along with slice 6. However, slice 8 is located in container 1 (e.g., 410A). The slices are then retrieved from containers 1 and 2 (e.g., 410A and 410B) and the selected assets contained in slices 2, 6, and 8 are restored to the appropriate location on the production host.

While the above-described example and FIG. 4 have relatively few slices and containers, the system and method in accordance with one or more embodiments of the invention may involves hundreds, thousands, or more slices and assets as well tens, hundreds or more containers, depending on the size of the production host/storage device that the backup was formed from. While the slice IDs, assets and other components described above are in a human readable form, the slice IDs, assets, and other components recorded in the backup metadata and/or in-memory layout may be in the form of hash values, computer readable code, and other means for allowing the backup agent or related device to quickly perform the methods of FIGS. 2 and 3.

Other combinations of assets, slices, and containers, as well as hierarchical arrangement of the assets and slices may use the methods outlined above with regards to the method of FIGS. 2 and 3. The tables, layouts and containers of FIG. 4 are non-limiting and intended as an example only.

End Example

Additionally, as discussed above, embodiments of the invention may be implemented using computing devices. FIG. 5 shows a diagram of a computing device in accordance with one or more embodiments of the invention. The computing device (500) may comprise one or more computer processors (510), non-persistent storage (530) (e.g., volatile memory, such as random access memory (RAM), cache memory), persistent storage (540) (e.g., a hard disk, an optical drive such as a compact disk (CD) drive or digital versatile disk (DVD) drive, a flash memory, etc.), a communication interface (520) (e.g., Bluetooth interface, infrared interface, network interface, optical interface, etc.), input devices (560), output devices (550), and numerous other elements (not shown) and functionalities. Each of these components is described below.

In one embodiment of the invention, the computer processor(s) (510) may be an integrated circuit for processing instructions. For example, the computer processor(s) may be one or more cores or micro-cores of a processor. The computing device (500) may also comprise one or more input devices (560), such as a touchscreen, keyboard, mouse, microphone, touchpad, electronic pen, or any other type of input device. Further, the communication interface (520) may comprise an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may comprise one or more output devices (550), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (510), non-persistent storage (530), and persistent storage (540). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of one or more computing devices. In one or more embodiments, selected assets are restored from a plurality of slices stored on a plurality of containers in a backup storage system. When a restoration is requested, the invention described above, allows for quickly and methodically locating the assets in the containers, without having to crawl each container. By searching a slice list in the backup metadata, each slice associated with a selected asset(s) can quickly be identified.

Further, when more than one slice is associated with the selected assets, the invention allows for quick searching of a hierarchical layout of the slices and assets to quickly decide which slices comprise the asset once the highest-level slice in the hierarchy is discovered. This eliminates the need to crawl the entire slice list. Once the highest level is discovered, only its children need to be searched for the asset. Once the slices associated with an asset are found they can be quickly restored from the corresponding containers which hold the assets. This may result in a quicker and more efficient restoration, resulting in better utilization of system and network resources as well as a better backup and recovery performance.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for performing a restoration of selected assets from a backup, the method comprising:
   receiving a request to perform the restoration of the selected assets from the backup to a production host, wherein:
     the backup comprises of a plurality of assets associated with a file system, which are stored in a plurality of slices,
     the file system has a hierarchical structure,
     the plurality of slices is organized in a hierarchical structure that is based on the hierarchical structure of the file system, and
     the selected assets are chosen from the plurality of assets;
   retrieving, in response to the request, metadata for the backup comprises a mapping between the plurality of assets and the plurality of slices;
   identifying, using the metadata for the backup, one or more slices storing the selected assets,
     wherein when identifying the one or more slices storing the selected asset, an in-memory hierarchical layout of the slices is created from the metadata for the backup,
     wherein the in-memory hierarchical layout organizes the plurality of slices based on relationships between parent and child slices of each of the plurality of slices, and
     wherein slices of the in-memory hierarchical layout are specified in a form of hash values;
   identifying, using the metadata from the backup, one or more containers that store the one or more slices comprising the selected assets; and
   restoring the selected assets using the identified one or more container by retrieving the one or more slices to the production host.

2. The method of claim 1, wherein identifying the slices storing the selected asset further comprises:

searching the in-memory hierarchical layout for the highest-level slice associated with the selected assets;
determining if the highest-level slice stores all of the selected assets; and
identifying the highest-level slice as the one or more slices storing the selected assets when all of the selected assets are determined to have been stored in the highest-level slice.

3. The method of claim 2, wherein if the highest-level slice is determined not to store all of the selected assets, the next level of slices is searched until all of the slices storing the selected assets are identified, wherein the next level of slices are child slices of the highest-level slice.

4. The method of claim 3, wherein in addition to the highest-level slice, all of the identified slices storing the selected asset are identified as the one or more slices storing the selected assets.

5. The method of claim 1, wherein the metadata for the backup further comprises a mapping between the plurality of slices and each container that holds a portion of the plurality of slices and the mapping between the plurality of slices and each container is used to identify the one or more containers holding the one or more slices storing the selected assets.

6. The method of claim 1, wherein the slices storing the selected assets are stored in more than one of the one or more containers.

7. The method of claim 1, wherein the selected assets are restored to their original location in the file-system of the production host using a mapping between the plurality of assets and the file system stored in the metadata for the backup.

8. A non-transitory computer readable medium comprising computer readable program code, which when executed by a computer processor, enables the computer processor to perform a method for performing a restoration of selected assets from a backup, the method comprising:
receiving a request to perform the restoration of the selected assets from the backup to a production host, wherein:
the backup comprises of a plurality of assets associated with a file system, which are stored in a plurality of slices,
the file system has a hierarchical structure,
the plurality of slices is organized in a hierarchical structure that is based on the hierarchical structure of the file system, and
the selected assets are chosen from the plurality of assets;
retrieving, in response to the request, metadata for the backup comprises a mapping between the plurality of assets and the plurality of slices;
identifying, using the metadata for the backup, one or more slices storing the selected assets,
wherein when identifying the one or more slices storing the selected asset, an in-memory hierarchical layout of the slices is created from the metadata for the backup,
wherein the in-memory hierarchical layout organizes the plurality of slices based on relationships between parent and child slices of each of the plurality of slices, and
wherein slices of the in-memory hierarchical layout are specified in a form of hash values;
identifying, using the metadata from the backup, one or more containers that store the one or more slices comprising the selected assets; and
restoring the selected assets using the identified one or more container by retrieving the one or more slices to the production host.

9. The non-transitory computer readable medium of claim 8, wherein identifying the slices comprising the selected asset further comprises:
searching the in-memory hierarchical layout for the highest-level slice associated with the selected assets;
determining if the highest-level slice stores all of the selected assets; and
identifying the highest-level slice as the one or more slices storing the selected assets when all of the selected assets are determined to have been stored in the highest-level slice.

10. The non-transitory computer readable medium of claim 9, wherein if the highest-level slice is determined not to store all of the selected assets, performing a depth-first search on the hierarchical structure starting at the highest-level slice until all of the slices storing the selected assets are identified.

11. The non-transitory computer readable medium of claim 10, wherein in addition to the highest-level slice, all of the identified slices storing the selected asset are identified as the one or more slices storing the selected assets.

12. The non-transitory computer readable medium of claim 8, wherein the metadata for the backup further comprises a mapping between the plurality of slices and each container that holds a portion of the plurality of slices and the mapping between the plurality of slices and each container is used to identify the one or more containers holding the one or more slices storing the selected assets.

13. The non-transitory computer readable medium of claim 8, wherein the selected assets are restored to their original location in the file-system of the production host using a mapping between the plurality of assets and the file system stored in the metadata for the backup.

14. A system comprising:
one or more processors; and
at least one memory comprising instructions, which when executed by the one or more processors, perform a method for performing a restoration of selected assets from a backup, the method comprising:
receiving a request to perform the restoration of the selected assets from the backup, wherein:
the backup comprises of a plurality of assets associated with a file system, which are stored in a plurality of slices,
the file system has a hierarchical structure,
the plurality of slices is organized in a hierarchical structure that is based on the hierarchical structure of the file system, and
the selected assets are chosen from the plurality of assets;
retrieving, in response to the request, metadata for the backup comprises a mapping between the plurality of assets and the plurality of slices;
identifying, using the metadata for the backup, one or more slices storing the selected assets;
identifying, using the metadata from the backup, one or more containers that store the one or more slices comprising the selected assets,
wherein when identifying the one or more slices storing the selected asset, an in-memory hierarchical layout of the slices is created from the metadata for the backup, wherein the in-memory hierarchical layout organizes the plurality of slices based on relationships between parent and child slices of each of the plurality of slices, and wherein slices of the in-memory hierarchical layout are specified in a form of hash values; and restoring the selected assets using the identified one or more container by retrieving the one or more slices to the production host.

15. The system of claim 14, wherein identifying the slices storing the selected asset further comprises:

searching the in-memory hierarchical layout for the highest-level slice associated with the selected assets, wherein the highest-level slice comprises at least a portion of a file system path associated with at least one of the selected assets;

determining if the highest-level slice stores all of the selected assets; and identifying the highest-level slice as the one or more slices storing the selected assets when all of the selected assets are determined to have been stored in the highest-level slice.

16. The system of claim 15, wherein if the highest-level slice is determined not to store all of the selected assets, the next level of slices is searched until all of the slices storing the selected assets are identified and, in addition to the highest-level slice, all of the identified slices storing the selected asset are identified as the one or more slices storing the selected assets.

17. The system of claim 14, wherein the metadata for the backup further comprises a mapping between the plurality of slices and each container that holds a portion of the plurality of slices and the mapping between the plurality of slices and each container is used to identify the one or more containers holding the one or more slices storing the selected assets.

* * * * *